July 7, 1959 R. N. BAKER 2,893,753

ADJUSTABLE TRAILER HITCH

Filed Dec. 9, 1957 3 Sheets-Sheet 1

INVENTOR.
Robert N. Baker

BY Julian Caplan

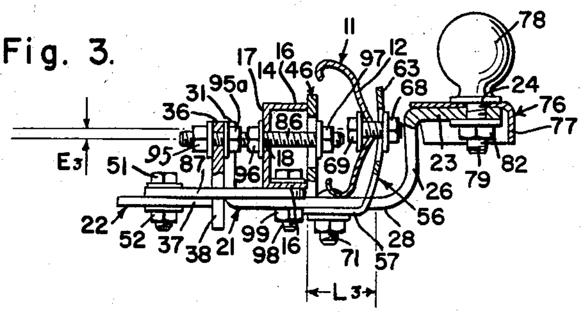
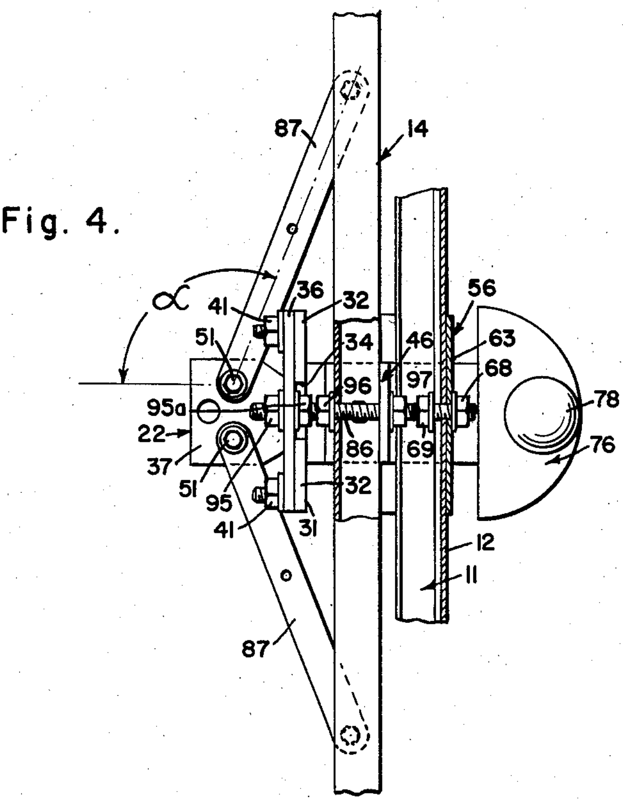
INVENTOR.
Robert N.Baker
BY Julian Caplan

July 7, 1959 R. N. BAKER 2,893,753
ADJUSTABLE TRAILER HITCH
Filed Dec. 9, 1957 3 Sheets-Sheet 3
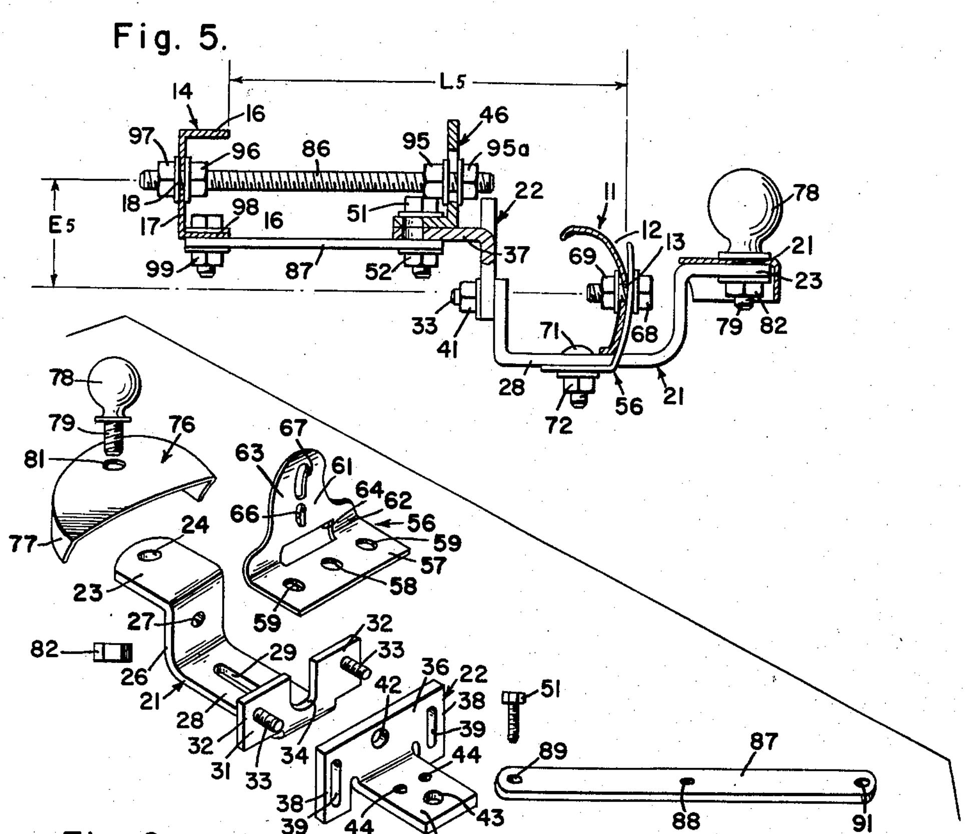
Fig. 6.
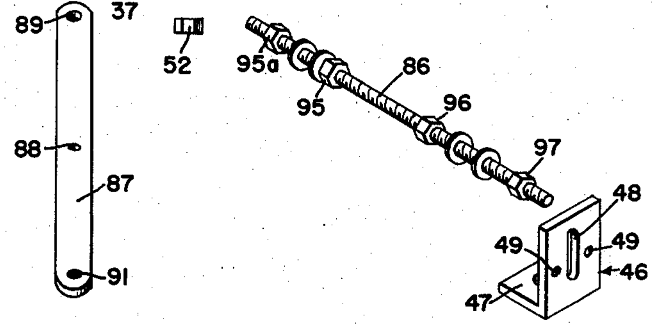
INVENTOR.
Robert N. Baker
BY Julian Caplan United States Patent Office 2,893,753

Patented July 7, 1959

2,893,753

ADJUSTABLE TRAILER HITCH

Robert N. Baker, Hayward, Calif., assignor of one-half to Independent Iron Works, Inc., Oakland, Calif., a corporation of California Application December 9, 1957, Serial No. 701,437

5 Claims. (Cl. 280—501)

This invention relates to a new and improved adjustable trailer hitch. This application is a continuation-in-part of my copending application No. 559,271, now abandoned.

Trailer hitches are preferably securely attached to the vehicle by fastening to a transverse frame member (which is part of the chassis structure and is disposed forwardly of the rear bumper) and to the bumper itself. In various makes and models of automobiles, the precise relative location of the transverse frame member and the bumper varies. Inasmuch as trailer hitches are commonly extra equipment and are not provided by the manufacturer of the vehicle, it is necessary to provide wide adjustability of the parts of the hitch in order to accommodate as many different makes and models of automobiles as possible. The present invention is concerned with providing such adjustability.

The relative location of the transverse frame member to the bumper provides several problems. The first problem is the distance between the two elements measured in the longitudinal direction of the vehicle. The second problem arises out of the elevation of the two parts relative to each other in a vertical direction. The third problem arises from interference with parts of the vehicle interposed between the two elements. The present invention is designed to provide a solution for a wide variety of such problems.

One of the principal features of the present invention is the provision of a drawbar which is separated into two parts, the rearward part accommodating the knob of the hitch and the forward part being detachably secured to the rearward part in such manner that it may be adjusted in a vertical direction relative thereto or, when required, inverted. This drawbar construction enhances the adjustability of the device in a simple and effective manner without the necessity of multitudinous parts to accomplish the same object.

Another feature of the invention is the provision of an elongated bolt or threaded rod extending between an upstanding portion of the drawbar and the transverse vehicle frame member. The use of such a bolt enables the hitch to be used in vehicles covering a wide range of distances between the bumper and transverse frame member.

Still another feature of the invention is the provision of an angularly shaped element which may either be fastened to the transverse frame member in order to reinforce the same or be attached to the forward portion of the drawbar, the member being suitably apertured to receive one end of the threaded rod in a variety of different positions of adjustment.

A still further feature of the present invention is the provision of a pair of links extending between the forward end of the drawbar and the transverse frame member, which supplement the bolt heretofore mentioned in many different installations. Such links enable the drawbar to be connected to the transverse frame member at three separate locations, thereby enhancing the security of the attachment and likewise resisting any tendency of the drawbar to work out of proper alignment under load conditions.

A further feature of the invention is the fact that the aforementioned links interconnecting the drawbar and the transverse frame member may be rotated through a considerable angular movement prior to completion of installation, thereby enhancing the adjustability of the device. For example, in some installations the forward end of the drawbar is located so remote from the transverse frame member that the links extend straight forward. In other installations the transverse frame member may actually be located rearwardly of the forward end of the drawbar. In such installations the links may be swung to a position extending rearwardly by an angle of as much as 40°. Accordingly, the links may be adjusted within a range of 130° of angular movement to accommodate many different types and models of vehicles.

A still further feature of the invention is the provision of a brace fixed to the underside of the rearward drawbar member and projecting up to beyond the upper side of the drawbar member and engaging the rearward face of the bumper, the brace being apertured for reception of the drawbar. Such arrangement improves the attachment of the hitch to the bumper and affords greater adjustability.

Other features of the invention are the fact that many of the parts hereinafter described in detail are supplied with a number of different apertures, many of the apertures being elongated, so as to permit wide adjustability of the various parts relative to each other and, further, to permit the parts to be assembled in different relationships with respect to adjacent parts.

Other objects of the present invention will become apparent upon reading the following specification and referring to the accompanying drawings in which similar characters of reference represent corresponding parts in each of the several views.

In the drawings:

Fig. 3 is a view similar to Fig. 1, showing the device in a different position of adjustment;

Fig. 4 is a top plan of the construction of Fig. 3;

Fig. 5 is a view similar to Fig. 1 of the device in still another position of adjustment;

Fig. 6 is an exploded perspective view of the elements of the hitch.

Figure 1:
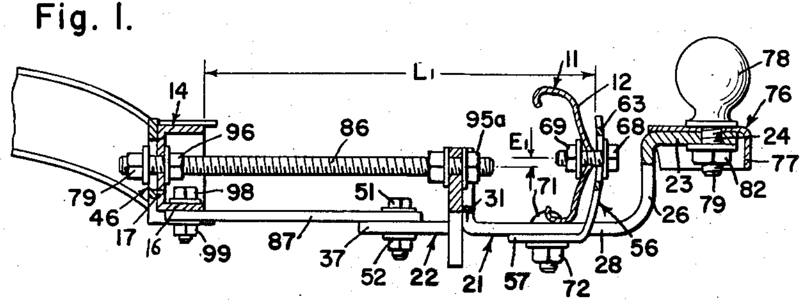
Fig. 1 is a vertical sectional view of the hitch in one position of adjustment.
Figure 2:
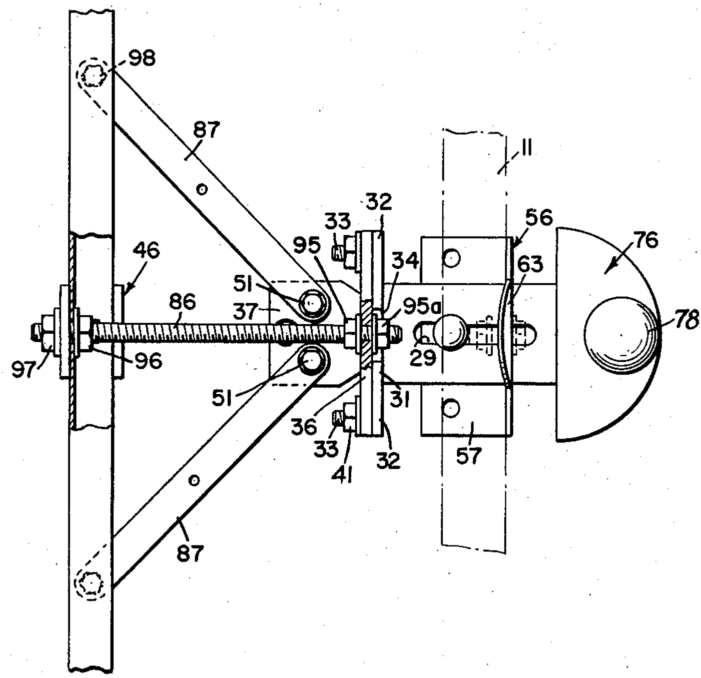
Fig. 2 is a top plan of the structure of Fig. 1.

A common automotive vehicle employs a rear bumper 11, the shape of which is subject to wide variation. As illustrated herein in cross-section, such bumper has a rearwardly convex surface 12 which is formed with a central aperture 13. The vehicle also is constructed with a transverse frame member 14 which is illustrated herein as a channel turned on its side with the flanges 16 pointed rearwardly and the web 17 formed with an aperture 18. It will be understood that the shape of the bumper 11 and of the frame member 14 is subject to very wide variation, the various manufacturers employing different shapes and the shapes varying from model to model and from year to year. The distance between the bumper 11 and frame member 14 is infinitely variable, and such distance is shown in Fig. 1 as $L_1$, in Fig. 3 as $L_3$ and in Fig. 5 as $L_5$. Another variable is the difference in elevation between the bumper 11 and frame member 14, and such distance is shown in the accompanying drawings as the difference in elevation between aperture 13 and aperture 18 and marked in the accompanying drawings as E, with appropriate subscripts. In addition, various obstructions may be interposed between bumper 11 and frame member 14, such obstructions not being illustrated herein, but it will be understood that a variety of different chassis members may intervene.
understood that a variety of different chassis members Accordingly, the present invention provides a hitch which is preferably fastened both to the bumper 11 and to the frame member 14. The hitch consists of a plurality of elements suitably, and preferably adjustably, secured to each other and to the vehicle. A drawbar consisting of rearward drawbar element 21 and forward drawbar element 22 is provided. Element 21 is an irregularly shaped gooseneck member having a horizontally disposed rearward portion 23 provided with an aperture 24 adjacent its rearward end; a depending, substantially vertical portion 26 disposed at the forward end of portion 23 and formed with a central aperture 27; a horizontally, forwardly disposed portion 28 at the lower end of the portion 26 and formed with a longitudinally elongated slot 29; and an upstanding, substantially vertically disposed forward end portion 31 at the forward end of portion 28. Portion 31 is wider than portions 23, 26 and 28, and each of the laterally offset ends 32 carries a forwardly, horizontally projecting threaded stud 33. Portion 31 is formed with a slot 34 extending downwardly from the top edge thereof to adjacent the bottom edge, slot 34 having sufficient width to accommodate a nut, as hereinafter explained.

The forward drawbar portion 22 is likewise irregularly shaped. Essentially it consists of a vertically disposed rearward portion 36 having a width substantially equal to the member 31 and a horizontally, forwardly extending tongue portion 37 of lesser width than portion 36. The laterally offset edges 38 of portion 36 depend below the level of tongue 37 and are formed with vertically elongated slots 39 spaced apart the same distance as studs 33. Thus, the members 21 and 22 are secured together by the studs 33 extending through the slots 39 and being held in place by nuts 41. By reason of the elongation of slots 39, a considerable variation may be secured in the relative elevations of the two members 21, 22. Further, the member 22 may readily be inverted and, inasmuch as tongue 37 is offset with respect to the horizontal center line of member 22, this feature likewise provides adjustability. Portion 36 is formed with an aperture 42 in line with slot 34. Tongue 37 is provided with an aperture 43 adjacent its forward end, and also with a pair of laterally offset holes 44 disposed rearwardly of aperture 43.

There is also provided an angular member 46, one flange of which is formed with a circular hole 47 and the other flange of which is formed with an elongated slot 48 centrally disposed, and a pair of laterally offset holes 49. The spacing between holes 49 is equal to that between holes 44. Member 46 may be attached to the frame member 14, as hereinafter appears and as particularly illustrated in Fig. 1, to reinforce member 14; or it may be attached to forward drawbar member 22, bolts 51 passing through holes 44 and 49, and nuts 52 being employed for such purpose.

Another part of the hitch is the bumper brace 56 which is irregularly shaped, being formed with a horizontally disposed wide base 57 provided with a central hole 58 and a pair of laterally offset holes 59 and an upwardly directed tongue 61 which narrows proceeding outwardly and which is joined to the base 57 by a rounded corner 62 and proceeds outwardly in a convex zone 63 having a curvature similar to the common curvatures of bumpers. A laterally extending slot 64 is formed in the corner 62 and has a width slightly greater than the width of members 26 and 28. The portion 61 is formed with two slots 66 and 67 vertically spaced apart. Slots 66, 67 are positioned to receive bolt 68 which extends through either slot 66 or slot 67 and through aperture 13 in bumper 11, to secure the brace 56 to the bumper. In one common installation base 57 is attached to the rearward drawbar member 21 by means of bolt 71 and nut 72, bolt 71 passing through aperture 58 and slot 29. By reason of the elongation of slot 29, considerable adjustability in the location of brace 56 relative to drawbar portion 21 is afforded.

A semi-circular, horizontally disposed shield 76 having a depending peripheral skirt 77 protects the rearward end of the drawbar element 23. A hitch knob 78 having a depending threaded end 79 extends through aperture 81 in shield 76 and also through aperture 24, being secured in place by nut 82. It will be understood that the knob 78 may be removed when the trailer is not attached and a suitable bolt used to replace the threaded end 79 to hold the shield 76 in place.

The forward drawbar portion 22 is attached to the frame member 14 by various means. In most installations the most satisfactory means is an elongated, threaded rod 86, one end of which passes through aperture 18 and the other end of which passes through one of the apertures in the drawbar, such as the aperture 42. Several means whereby the rod 86 is employed to connect the drawbar to the frame member are illustrated in Figs. 1, 3 and 5 and are hereinafter described in greater detail. Supplementing the rod 86 are a pair of links 87, each formed with a central hole 88 and end holes 89 and 91. In ordinary installations, bolts 51 and nuts 52 are used to secure the links 87 to the forward drawbar portion 22, the bolts 51 passing through apertures 89 and 44. Inasmuch as the holes 44 are spaced forwardly relative to portion 36 of forward drawbar member 22, the links 87 may swing between a directly forwardly extending position around through an obtuse angle of as great an amplitude as 130° until the outer ends of the links 87 are disposed rearwardly of the inner ends. Such arrangement of the links is shown particularly in Fig. 3 and described in greater detail.

Turning now to the installation shown in Fig. 1, it will be seen that the bumper 11 is spaced slightly higher than the transverse frame member 14, by a short distance $E_1$, and that the distance $L_1$ between the two elements is the greatest shown in the accompanying illustrations. Accordingly, the drawbar elements 21, 22 are connected together with studs 33 passing through slots 39 and being secured in place by nuts 41 in such position that the tongue 37 is slightly lower than portion 28. Threaded rod 86 at its forward end is secured to web 17 of transverse frame member 15 by means of a pair of nuts 96, 97 on opposite sides of web 17. Angular member 46 is used to reinforce the member 14, and accordingly rod 86 likewise passes through slot 48 therein. The rearward end of rod 86 passes through hole 42 in portion 36 of forward drawbar member 22 and is secured thereto by a pair of nuts 95—**95*a* on opposite sides of portion 36. The width of slot 34 is sufficient to accommodate nut 95*a*. To afford stability to the construction, the links 87 are attached at their rearward ends by bolts 51 extending through holes 44 in tongue 37, and at their forward ends by bolts 98 passing through holes in the lower flange 16 of member 14 and secured in place by nuts 99. The attachment of bumper brace 56 to bumper 11** is in the manner heretofore described and not repeated herein.

In the arrangement of the parts shown in Fig. 3, it will be noted that the transverse frame member 14 is located a considerable distance rearwardly from the position of the corresponding member in Fig. 1, such distance being denominated by the short distance $L_3$. The relative elevation of the two members is substantially the same as in Fig. 1. To accommodate this arrangement of the parts, the two drawbar members 21, 22 are secured relative to each other in the same manner as in Fig. 1. However, the threaded rod 86 extends rearwardly of member 22 rather than forwardly, and for such purpose rod 86 is secured to portion 36 by means of nuts 95—**95*a*, and extends through the slot 34 and thence through the hole 18 in web 17. For this purpose rod 86 may be cut to size. The reinforcing angular member 46 is employed to assist in anchoring rod 86 by being positioned as illustrated in Fig. 3, with one flange extending vertically, upwardly across the outer ends of flanges 16 of member 14, and the other flange of member 46 being placed underneath the member 14. Accordingly, nuts 96 and 97 engage web 17 and member 46, respectively. Inasmuch as tongue 37 is positioned forwardly relative to transverse frame member 14, the links 87 are swung rearwardly and their outer ends are connected to the lower flange of member 14 by bolts 98 and nuts 99. The location of holes 44 in tongue 37, through which bolts 51 pass, is sufficiently forward of portion 36 of drawbar member 22 to permit the 130° angle alpha ($\alpha$) which is the maximum permissible angle of the links 87. The attachment of bumper brace 56 to bumper 11** is in the manner heretofore described.

In Fig. 5, the distance $L_5$ between bumper 11 and frame member 14 is substantially the same as in Fig. 1, but the difference of elevation $E_5$ is substantially greater than the corresponding difference of elevation $E_1$ in Fig. 1. To accommodate this difference in elevation, the forward drawbar member 22 is inverted from the position occupied in Figs. 1 and 3, so that the tongue 37 is considerably higher than the portion 28 of drawbar member 21 which fits under the bumper 11. To anchor threaded rod 86 in position, the angular member 46 is bolted to tongue 37 by bolts 51 passing through holes 49 and 44, and the rearward end of rod 86 then extends through hole 47 in member 46 and is held in place by nuts 95—95a. The forward end of rod 86 is secured to member 14 by units 96, 97.

The foregoing detailed description of Figs. 1–5 illustrates three important relative positions of the members making up the hitch. It will be apparent, however, from the construction of the elements, that considerably greater adjustability is afforded. Thus, the elongated slots 39 make it possible to raise or lower member 22 relative to member 21 within the limits of the length of slots 39, and by inverting member 22 additional adjustability is afforded. By placing angular member 46 on the drawbar assembly as by securing member 46 to the tongue 37 in the manner shown in Fig. 5, additional adjustability is afforded. Elongated slot 29 permits the bumper brace 56 to be moved back and forth along the length of the portion 28. The elongated rod 86 and the pivotal attachment of the links 87 likewise accommodate different distances between the bumper 11 and member 14.

Although the foregoing invention has been described in some detail by way of illustration and example for purposes of clarity of understanding, it is understood that certain changes and modifications may be practiced within the spirit of the invention and scope of the appended claims.

What is claimed is:

1. A trailer hitch comprising a drawbar having a rearward part and a forward part, said parts being detachably connected together in abutting relationship in a plurality of different positions of adjustment to vary the elevations of said parts relative to each other, and means for attaching said forward part to a vehicle frame member, said last-mentioned means including an elongated threaded rod secured at one end to said forward part and at the opposite end to said frame member, and a pair of links on opposite sides of said drawbar, a first end of each said link being secured to said forward drawbar part and a second end to said frame member, said links being swingable from a position with said second end directly forward of said first end to a position with said second end at least slightly rearward of said first end.

2. A hitch according to claim 1, which further comprises a bumper brace, and means for securing said brace to said rearward part of said drawbar in a plurality of positions of adjustment longitudinally of said drawbar, said brace having an upwardly directed portion for attachment to a bumper, said brace being apertured to receive said drawbar, the portion of said brace below the aperture being disposed on the underside of said drawbar and secured to said drawbar, said drawbar being slidable through said aperture, the portion of said brace forward of said bumper, being disposed entirely below the level of said drawbar.

3. A trailer hitch comprising a drawbar having a rearward part and a forward part, said parts being detachably connected together in abutting relationship in a plurality of different positions of adjustment to vary the elevations of said parts relative to each other, and means for attaching said forward part to a vehicle frame member, said last-mentioned means including a pair of links on opposite sides of said drawbar, a first end of each said link being secured to said forward drawbar part and a second end to said frame member, said links being swingable from a position with said second end directly forward of said first end to a position with said second end at least slightly rearward of said first end.

4. A trailer hitch comprising a first drawbar member having a substantially vertical flange at its forward end and means for attachment of a trailer at its opposite end, a second drawbar member having a substantially vertical flange at its rearward end and a forwardly projecting tongue, said vertical flanges having cooperating means for detachably securing said members together in abutting relationship in a plurality of different positions of adjustment to vary the elevations of said tongue and forward end relative to each other, and means for attaching said second drawbar member to a vehicle frame member, said last mentioned means including a pair of links on opposite sides of said drawbar members, a first end of each said link being secured to said second drawbar member and a second end to said vehicle frame member, said links being swingable from a position with said second end directly forward of said first end to a position with said second end at least slightly rearward of said first end.

5. A hitch according to claim 4, in which said forward member may be attached to said rearward member in a first position and in a second position inverted relative to said first position.

References Cited in the file of this patent

UNITED STATES PATENTS

| | | |
|---|---|---|
| 1,342,507 | McNamera | June 8, 1920 |
| 2,485,743 | Koback | Oct. 25, 1949 |
| 2,622,892 | Lowman | Dec. 23, 1952 |
| 2,719,733 | Riemann | Oct. 4, 1955 |